(12) United States Patent
Pyun

(10) Patent No.: US 10,465,322 B2
(45) Date of Patent: Nov. 5, 2019

(54) CUSHION OR PILLOW HAVING EMBOSSING AND/OR DEBOSSING ELEMENTS, APPARATUS, SYSTEM, AND A METHOD THEREOF

(71) Applicant: Kumran Pyun, Newburgh, NY (US)

(72) Inventor: Kumran Pyun, Newburgh, NY (US)

( * ) Notice: Subject to any disclaimer, the term of this patent is extended or adjusted under 35 U.S.C. 154(b) by 170 days.

(21) Appl. No.: 15/432,557

(22) Filed: Feb. 14, 2017

(65) Prior Publication Data

US 2017/0233916 A1    Aug. 17, 2017

Related U.S. Application Data

(60) Provisional application No. 62/295,126, filed on Feb. 14, 2016.

(51) Int. Cl.
*D06C 23/04* (2006.01)
*B32B 5/26* (2006.01)
(Continued)

(52) U.S. Cl.
CPC .............. *D06C 23/04* (2013.01); *A47C 7/021* (2013.01); *A47G 9/0253* (2013.01); *B29C 43/003* (2013.01); *B29C 43/02* (2013.01); *B29C 43/021* (2013.01); *B29C 59/026* (2013.01); *B32B 1/00* (2013.01); *B32B 3/28* (2013.01); *B32B 5/024* (2013.01); *B32B 5/026* (2013.01); *B32B 5/06* (2013.01); *B32B 5/26* (2013.01); *B32B 7/05* (2019.01); *B32B 7/12* (2013.01); *B32B 9/025* (2013.01); *B32B 9/047* (2013.01);
(Continued)

(58) Field of Classification Search
CPC .......... B29K 2105/256; B29K 2713/00; A47G 9/0253; A47G 9/10; A47G 9/1045; D06C 23/04; B32B 1/00; B32B 2250/02; B32B 2250/20; B32B 2601/00; B32B 3/28; B32B 5/26; B32B 2262/0215; B32B 2262/0223; B32B 2262/0269; B32B 2262/0276; B32B 2262/04; B32B 2262/062; B32B 2439/06; B32B 2451/00; B32B 5/024; B32B 5/026; B32B 5/06; B32B 7/045; B32B 7/05; B32B 7/12; B32B 9/025; B32B 9/047
See application file for complete search history.

(56) References Cited

FOREIGN PATENT DOCUMENTS

WO    WO2017/023799    *  2/2017

* cited by examiner

*Primary Examiner* — Yan Lan
(74) *Attorney, Agent, or Firm* — Aziz M. Ahsan; Ahsan & Associates, PLLC

(57) ABSTRACT

The present invention relates generally to a pillow or cushion having embossing and/or debossing elements, apparatus, system, and a method thereof. More particularly, the invention encompasses an apparatus and a method to create fabric cushion or pillow that can have embossing or debossing or a combination of embossing and debossing on them. The invention further comprises of embossed and/or debossed cushion or pillow, with or without cushion filler or insert. These inventive cushion or pillow can be used for both indoor and outdoor purposes. The cushion or pillow sizes can be standard sizes, but they can also be custom sized for any measurement. Embossing and/or debossing are the processes of creating either raised or recessed relief, image, or design in emboss-able/deboss-able materials. For example, an embossed pattern would be raised against a background, while a debossed pattern would be sunken into the surface of the material.

12 Claims, 3 Drawing Sheets

(51) Int. Cl.
   *B32B 7/04*      (2019.01)
   *A47C 7/24*      (2006.01)
   *B29C 43/02*     (2006.01)
   *B32B 3/28*      (2006.01)
   *B32B 1/00*      (2006.01)
   *B29C 43/00*     (2006.01)
   *B32B 7/05*      (2019.01)
   *A47C 7/02*      (2006.01)
   *B29C 59/02*     (2006.01)
   *B32B 5/02*      (2006.01)
   *B32B 5/06*      (2006.01)
   *B32B 7/12*      (2006.01)
   *B32B 9/02*      (2006.01)
   *B32B 9/04*      (2006.01)
   *A47G 9/02*      (2006.01)
   *B29L 31/58*     (2006.01)
   *B29K 105/00*    (2006.01)

(52) U.S. Cl.
   CPC ........ *B29C 59/02* (2013.01); *B29K 2105/256* (2013.01); *B29K 2713/00* (2013.01); *B29L 2031/58* (2013.01); *B32B 2250/02* (2013.01); *B32B 2250/20* (2013.01); *B32B 2262/0215* (2013.01); *B32B 2262/0223* (2013.01); *B32B 2262/0269* (2013.01); *B32B 2262/0276* (2013.01); *B32B 2262/04* (2013.01); *B32B 2262/062* (2013.01); *B32B 2439/06* (2013.01); *B32B 2451/00* (2013.01); *B32B 2601/00* (2013.01)

CUSHION OR PILLOW HAVING EMBOSSING AND/OR DEBOSSING ELEMENTS, APPARATUS, SYSTEM, AND A METHOD THEREOF

CROSS-REFERENCE TO RELATED APPLICATION

The instant patent application claims priority to and the benefit of U.S. Provisional Patent Application Ser. No. 62/295,126, filed on Feb. 14, 2016, titled "Cushion Having Embossing and/or Debossing Elements, Apparatus, System, and A Method Thereof," the entire disclosure of which provisional application is incorporated herein by reference.

FIELD OF THE INVENTION

The present invention relates generally to a pillow or cushion having embossing and/or debossing elements, apparatus, system, and a method thereof. More particularly, the invention encompasses an apparatus and a method to create fabric cushion or pillow that can have embossing or debossing or a combination of embossing and debossing on them. The invention further comprises of embossed and/or debossed cushion or pillow, with or without cushion filler or insert. These inventive cushion or pillow can be used for both indoor and outdoor purposes. The cushion or pillow sizes can be standard sizes, but they can also be custom sized for any measurement. Embossing and/or debossing are the processes of creating either raised or recessed relief, image, or design in emboss-able/deboss-able materials. For example, an embossed pattern would be raised against a background, while a debossed pattern would be sunken into the surface of the material.

PURPOSES AND SUMMARY OF THE INVENTION

The invention is a novel cushion having embossing and/or debossing elements, apparatus, system, and a method thereof.

Therefore, one purpose of this invention is to provide a fabric cushion with embossing or debossing or a combination of embossing and debossing on it.

Another purpose of this invention is to provide an embossed and/or debossed cushion or pillow, with or without cushion filler or insert.

Yet another purpose of this invention is to provide an embossed pattern which would be raised against a background, and/or a debossed pattern which would be sunken into the surface of the fabric material.

Therefore, in one aspect this invention comprises a fabric cushion, comprising:
(a) a first fabric material having a first surface and a first peripheral edge, and wherein said first surface has one of an embossed image and debossed image;
(b) a second fabric material having a second surface and a second peripheral edge; and
(c) wherein said first peripheral edge is secured to said second peripheral edge for form said fabric cushion.

In another aspect this invention comprises a process for embossing and/or debossing fabric material, comprising the steps of:
(a) taking at least one first master mold having at least one first embossing and/or debossing location, and securing said at least one first master mold to a first platen;
(b) taking at least one second master mold having at least one second embossing and/or debossing location, and securing, said at least one second master mold to a second platen, such that said at least one first embossing and/or debossing location is directly opposite said at least one second embossing and/or debossing location;
(c) taking at least one fabric material and placing said at least one fabric material between said at least one first embossing and/or debossing location and said at least one second embossing and/or debossing location;
(d) applying pressure to one of said first platen and said second platen to force said first, platen and said second platen to come in pressure contact with said at least one fabric material, and to create at least one first embossed and/or debossed image on a first surface of said at least one fabric material from said at least one first embossing and/or debossing location, and at least one second embossed and/or debossed image on a second surface of said at least one fabric material from said at least one second embossing and/or debossing location;
(e) separating said first platen from said second platen; and
(f) removing said at least one fabric material having said at least one first embossed and/or debossed image on said first surface, and said at least one second embossed and/or debossed image on said second surface.

BRIEF DESCRIPTION OF THE DRAWINGS

The invention may best be further understood by reference to the ensuing detailed description in conjunction with the drawings in which.

DETAILED DESCRIPTION

Figure 1:
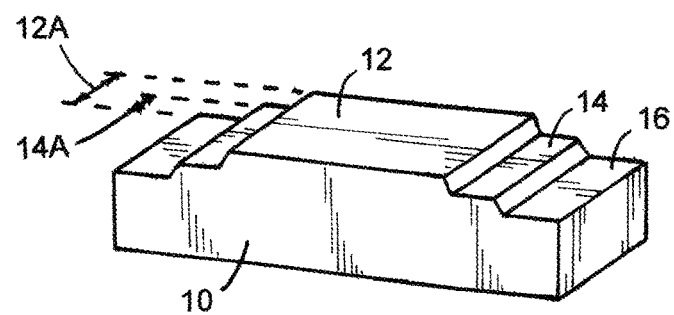
FIG. 1, illustrates a perspective view of a first master mold for embossing or debossing a fabric material.

The inventive cushion having embossing and/or debossing elements, apparatus, system, and a method thereof will now be discussed with reference to FIGS. 1 through 9B. Although the scope of the present invention is much broader than any particular embodiment, a detailed description of the preferred embodiment follows together with drawings.

These drawings are for illustration purposes only and are not drawn to scale. Like numbers represent like features and components in the drawings.

The invention is a cushion or pillow having embossing and/or debossing elements, apparatus, system, and a method thereof, and more particularly directed to fabric material having embossing and/or debossing elements thereon. The invention further comprises of embossed and/or debossed cushion or pillow, with or without cushion filler or insert. These inventive cushion or pillow can be used for both indoor and outdoor purposes. The cushion or pillow sizes can be standard sizes, but they can also be custom sized for any measurement. Embossing and/or debossing are the processes of creating either raised or recessed relief, image, or design in emboss-able/deboss-able materials. For example, an embossed pattern would be raised against a background, while a debossed pattern would be sunken into the surface of the material.

Figure 4:
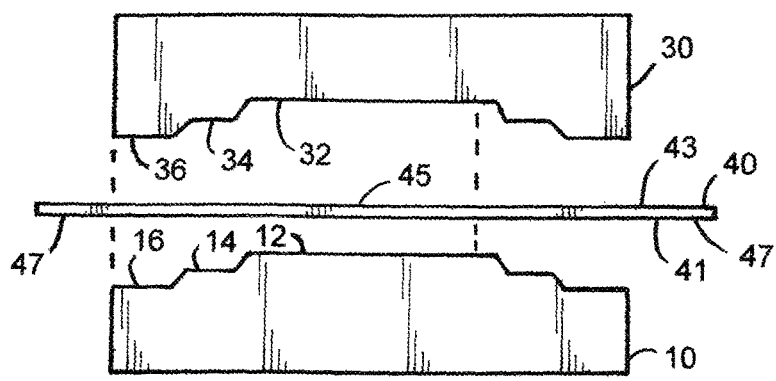
FIG. 4, illustrates a side view of the start of an embossing or debossing process for a fabric material.

FIG. 1, illustrates a perspective view of a first master mold 10, for embossing, or debossing a fabric material 40, shown in FIG. 4. The first master mold 10, or upper master mold 10, such as, a raised master mold or die 10, or male mold or die 10, has at least one raised or male portion 12, and an edge portion 16, creating a height 12A. For some applications one could also have an intermediate portion 14, that has a height 14A, when compared to the edge portion 16.

Figure 2:
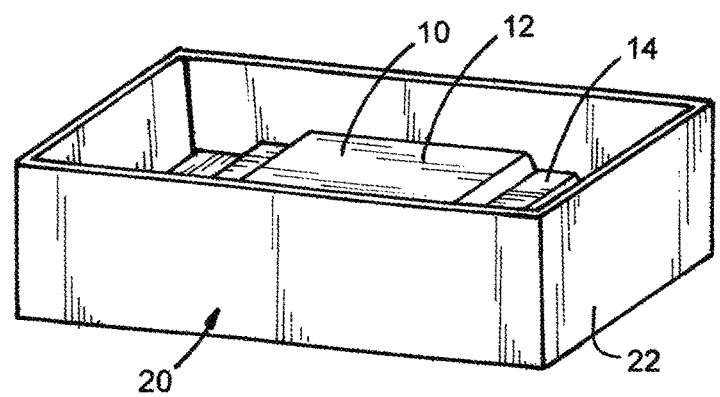
FIG. 2, illustrates a perspective view of a first master mold for embossing or debossing a fabric material being placed inside a mold housing.

FIG. 2, illustrates a perspective view of a first master mold 10, for embossing or debossing, a fabric material 40, being placed inside a mold housing 20. The mold housing 20, preferably has a peripheral wall 22, to accommodate and contain the raised master mold 10, and the recessed master mold 30, shown in FIG. 3.

Figure 3:
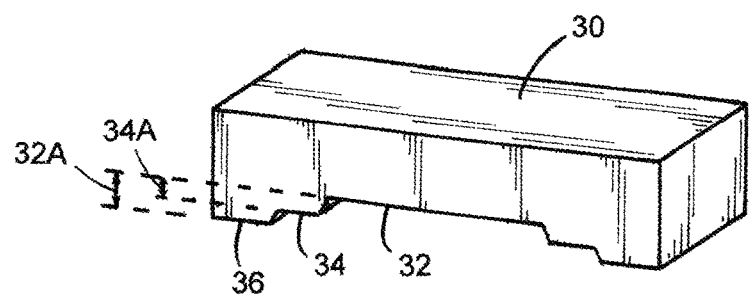
FIG. 3, illustrates a perspective view of a second master mold for embossing or debossing a fabric material.

FIG. 3, illustrates a perspective view of a second master mold 30, for embossing or debossing a fabric material 40. The second master mold 30, or lower master mold 30, such as, a recessed master mold or die 30, or female mold or die 30, has at least one recessed or female portion 32, and an edge portion 36, creating a depth 32A. For some applications one could also have an intermediate portion 34, that has a depth 34A, when compared to the edge portion 36.

FIG. 4, illustrates a side view of the start of an embossing or debossing process for a fabric material 40. The fabric material 40, has a first or upper or outside surface 43, a second or lower or inside surface 41, peripheral edges 47, and an area 45, for embossing or debossing images. The fabric material 40, is placed between the first or upper master mold 10, and the second or lower master mold 30, such that the peripheral edges 47, of the fabric material 40, are outside the peripheral edges of the upper master mold 10, and the lower master mold 30.

Figure 5:
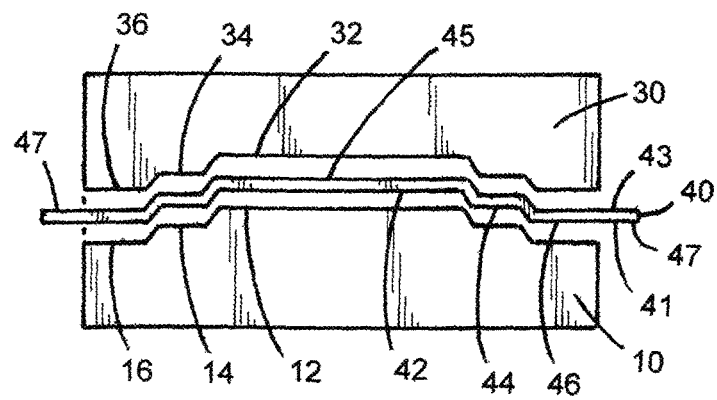
FIG. 5, illustrates a side view of an intermediate stage of an embossing or debossing process for a fabric material, according to a first process.

FIG. 5, illustrates a side view of an intermediate stage of an embossing or debossing process for a fabric material 40, according to a first process. After the fabric material 40, has been placed between the upper master mold 10, and the lower master mold 30, the upper master mold 10, and the lower master mold 30, are brought in contact with each other. It is preferred that the fabric material 40, that is sandwiched between the upper master mold 10, and the lower master mold 30, is subjected to pressure, so that the male portion 12, and the female portion 32, create an image 42, in the imaging location or area 45. This external pressure could be applied from either the upper mold 10, the lower mold 30, or both. Under this pressure the fabric material 40, has an image 42, created that has a depth 32A, or a raised width 12A. For some applications, where the upper master mold 10, has an intermediate portion 14, and where the lower master mold 30, has an intermediate portion 34, an intermediate portion 44, having, a depth 34A, or a width 14A, in the fabric 40, would be created.

Figure 6:
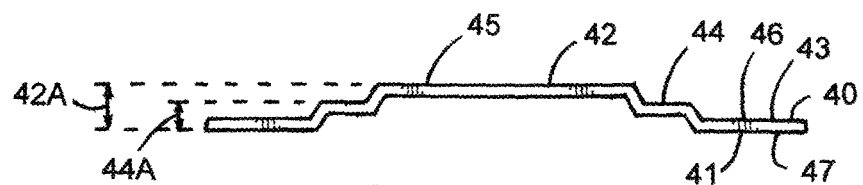
FIG. 6, illustrates a side view of a resulting embossed or debossed fabric material.

FIG. 6, illustrates a side view of a resulting embossed or debossed fabric material 40. The fabric material 40, has an embossed image 42, or a debossed image 42, in the image area 45. For some applications one could also have an intermediate embossed image 44, or an intermediate debossed image 44.

Figure 7:
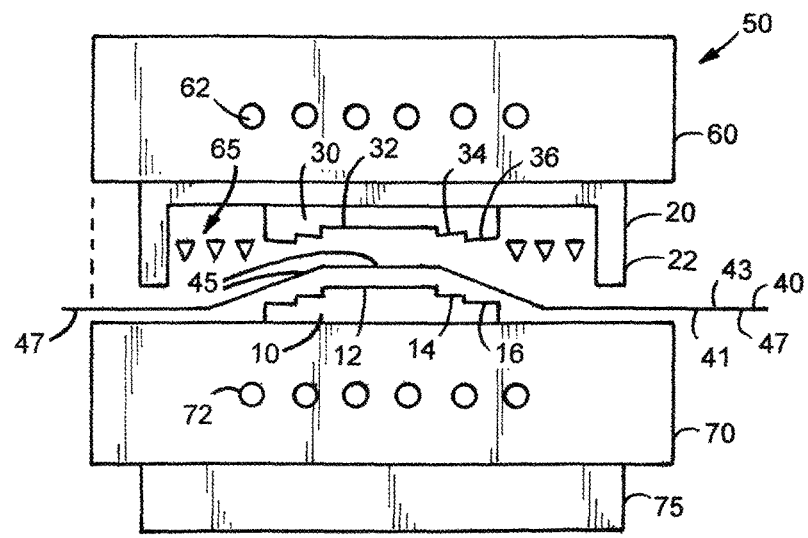
FIG. 7, illustrates a side view of an intermediate stage of an embossing or debossing process for a fabric material, according to a second process.

FIG. 7, illustrates a side view of an intermediate stage of an embossing or debossing process for a fabric material 40, according to a second process. After the fabric material 40, has been placed between the first master mold 10, and the second master mold 30, the first master mold 10, and the second master mold 30, are brought in contact with each other. It is preferred that the fabric material 40, that is sandwiched between the first master mold 10, and the second master mold 30, is subjected to pressure, so that the male portion 12, and the female portion 32, create an image 42, in the imaging location or area 45. This external pressure could be applied from either the first master mold 10, the second master mold 30, or both. Under this pressure the fabric material 40, has an image 42, created that has a depth 32A, or a raised width 12A. For some applications, one could also use an embossing/debossing press 50, having a first or upper platen 60, and a second or a lower platen 70, where the first master mold 10, has an intermediate portion 14, and where the second master mold 30, has an intermediate portion 34, an intermediate portion 44, having a depth 34A, or a width 14A, in the fabric 40, would be created. For some applications the mold housing 20, containing the first master mold 10, or the second master mold 30, is secured to a first or upper platen 60, and the second master mold 30, or the first master mold 10, is secured to the second or lower platen 70. For some applications the upper platen 60, has at least one external means 62, such as, a heating means 62, a cooling means 62, a pressure means 62, and combinations thereof, to name a few. Similarly, for some applications the lower platen 70, has at least one external means 72, such as, a heating means 72, a cooling means 72, a pressure means 72, and combinations thereof, to name a few. For some applications the embossing/debossing press 50, could be mounted on top of a table 75. In order to get a good or sharp embossed image 95, or a debossed image 90, external pressure 62, 72, and/or heat (higher temperature) 62, 72, is then applied from either the first platen 60, or the second platen 70, or both to the fabric material 40, via the first master mold 10, and the second master mold 30, to the fabric material 40, in order to create an embossed image 42, and/or a debossed image 42, in the image area 45, as more clearly shown in FIGS. 6, 8, 9A, and 9B.

As shown in FIG. 7, a male master mold 10, or a female master mold 30, is placed on the top surface of the lower platen 70, and the fabric 40, or material 40, is then placed on top of it such that the imaging portion or area 45, is within the male embossing portion 12, or the female embossing portion 32, and that the peripheral edges 47, of the fabric 40, are secured so that the fabric 40, is, in substantially a taut or stretched or substantially planar setting or position. The next step then is to mount the opposite corresponding master mold 10, 30, to the mold housing 20, or for some applications directly to the upper platen 60. Once the upper master mold 10, 30, and the lower master mold 30, 10, are in their secure position, the lower platen 70, or the upper platen 60, or both are then moved towards each other so as to create an embossed image 95, and/or a debossed image 90, on the fabric 40. In order to create a good embossed image 95, and/or a debossed image 90, on the fabric 40, or material 40, the lower master mold 10, 30, and the upper master mold 30, 10, are pressed together tightly, such as, under a pressure. It is preferred that for almost all applications an external heat source 62, 72, be applied to the fabric material 40, so as to provide a clean or sharp embossed image 95, and/or debossed image 90, on the fabric 40.

Figure 8:
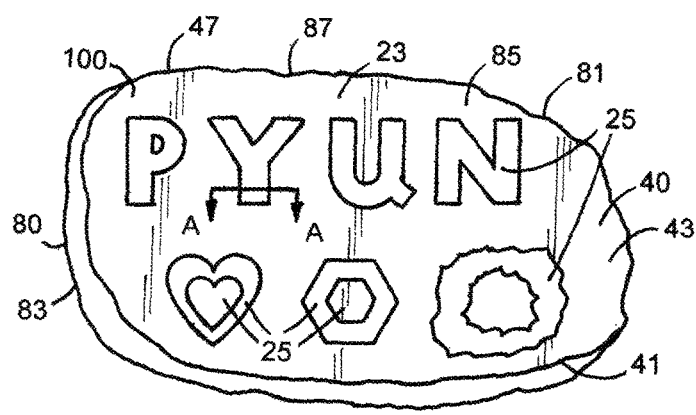
FIG. 8, illustrates a perspective view of a resulting embossed and/or debossed fabric cushion or pillow.

FIG. 8, illustrates a perspective view of a resulting embossed and/or debossed fabric cushion or pillow 23. The embossed and/or debossed fabric cushion or pillow 23, is made by taking the fabric material 40, having an embossed image 25, and/or debossed image 25, and securing at least a portion of the peripheral edges 47, of the bottom or lower surface 41, to at least a portion of the peripheral edges 87, of at least one bottom material or fabric 80, using at least one securing, means 81, which would result in, a first or upper or top cover 85, and a second or lower or bottom cover 83, and the desired shape for the pillow or cushion 23. The at least one securing means 81, could be selected from a group comprising stitching means 81, hook and loop means 81, an adhesive 81, an epoxy 81, a sewing means 81, a button means 81, a zipper means 81, and combinations thereof, to name a few. The top cover 85, now has the embossed image 25, and/or debossed image 25, while the bottom cover 83, could be of a plain fabric material 80. However, for some applications one could use the fabric material 40, having an embossed image 25, and/or debossed image 25, in place of the bottom fabric material 80, thus resulting in an embossed image 25, and/or debossed image 25, on both sides of the pillow or cushion 23. The resulting fabric cushion or pillow 23, now has an embossed image 25, and/or a debossed image 25, on both the upper surface 43, and the lower surface 41, of the fabric material 40, or the upper and under the surface of the top cover 85. It should be appreciated that the embossed image 25, and/or debossed image 25, could be selected from a group comprising, an alphabet image, a numeral image, a scenic image, a pattern image, a structural image, and combinations thereof, to name a few. It should be appreciated that the use of cushion or pillow 23, includes any fabric arrangement 23, that has a top cover 85, that is secured to a bottom cover 83, via at least a portion of the peripheral edges 47, 87, such as, for example, a pouch 23, a bag 23, to name a few. For some applications one could insert at least one insert-able or filler material 100, into the pillow or cushion 23, to give the pillow or cushion 23, its shape, or for the comfort of a user. The at least one insert-able or filler material 100, could be selected from a group comprising feather, goose down, cotton, polyester, fiber, fibrous filling material, and combinations thereof, to name a few.

Figure 9A:
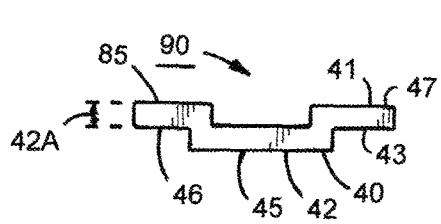
FIG. 9A, illustrates a side view taken along section A-A from FIG. 8, showing a resulting debossed fabric material image.

FIG. 9A, illustrates a side view taken along section A-A from FIG. 8, showing a resulting debossed fabric material image 90. As one can see that the fabric material 40, has a depth 12A, that was created when the male portion 12, of the first mold 10, was pressed against the fabric 40, around the imaging area 45.

Figure 9B:
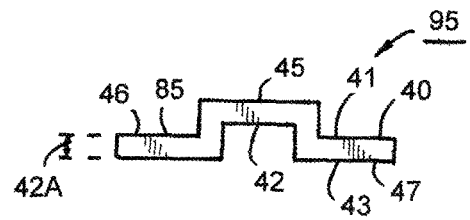
FIG. 9B, illustrates a side view taken along section A-A from FIG. 8, showing a resulting embossed fabric material image.

FIG. 9B, illustrates a side view taken along section A-A from FIG. 8, showing a resulting embossed fabric material image 95. As one can see that the fabric material 40, has a depth width 32A, that was created when the female portion 32, of the second mold 30, was pressed against the fabric 40, around the imaging area 45.

All embossing 95, creates a raised design 42, 25, typically either an image or text 25. There are two main types of embossing, wet embossing and dry embossing. Heat embossing is wet embossing as it, involves using a wet ink and thermos-graphic powder. While, dry embossing uses a metal stylus to trace a stencil in order to create a raised design 42, 44, made from a material 40, itself.

The material 40, that can be used with this invention, for example, could be selected from a group comprising, a knitted fabric (both flat knitted fabric and circular knitted fabric of any width), a woven fabric, a faux leather in mixed/blended content of polyester, rayon, cotton, nylon and/or spandex yarns, artificial leather, genuine leather, and combinations thereof, just to name a few. The material 40, can also be fused on the back side 41, with a material, such as, for example, knitted, woven, non-woven material, with at least one securing means, such as, for example, an adhesive, a glue, to name a few, to hold the embossing 25, in different ways whether soft, hard, semi-permanent or permanent embossing 25. The resulting embossed image 95, and/or debossed image 90, can have a varying depth 12A, 14A, 32A, 34A, 42A, for example, the depth 42, 44, for example, it could be about ⅓₂ inches to about ½ inches, on say a 25"×25" material 40. It should be understood that both the recessed portion 42, 44, and/or the raised portion 42, 44, of the image or design 25, could vary depending on the fabric or material 40, and its characteristics. Similarly, one could have one or more embossed image 95, and/or debossed image 90, on a single sheet or material 40, 23, or a cushion or pillow 23.

The male/female metal master mold 10, 30, production for the die materials, for example, could be selected from a group comprising metal, steel, stainless steel, zinc, magnesium, copper, brass, aluminum, lead alloy, graphite, a composite material, and combinations thereof, to name a few. The material used for the die construction for a specific application would depend upon several of factors.

Embossing 95, and/or debossing 90, semi-permanently or permanently alters the surface 41, 43, of a material 40, by providing a three-dimensional depth 42, 44, or raised effect 42, 44, on selected areas 25. The procedure requires the use of two dies 10, 30 one that is raised 10, and one that is recessed 30. The dies 10, 30, fit into each other so that when a material 40, is pressed between them, the raised die 10, forces the stock 40, into the recessed die 30, and creates the embossed impression 95. A specific level of pressure is applied to the dies 10, 30, in order to squeeze the fibers of the material 40, which results in a semi-permanently or permanently raised area 42, 44, in the material 40. When the dies 10, 30, are produced, a die maker engraves the desired image 25, into several metal plates 10, 30, which are the embossing dies 10, 30, for use on an embossing press 50. Generally, embossing is the process most often employed to attract attention or convey a high quality textural contrast 25, 42, in relation to the surrounding or edge area 46, of the material 40.

"Debossing" is similar to embossing, but recesses the design 25, rather than raising it. Rather than the material 40, being raised 42, 44, in specific areas, it is indented 42, 44, or has a three dimensional depth 12A, 14A, 32A, 34A. The debossing process involves applying pressure to the front side of a substrate or plate or platen 10, 30, and forcing the material 40, to be debossed 90, down from the surface 43. Although it is not as common as embossing 95, it is occasionally used to provide a different effect or appearance that fits a particular theme. Embossing 95, is used to create a distinctive effect 25.

There are several factors that need to be controlled during the embossing process, such as, for example:

(a) Pressure: the intensity of the impact on the weight of the stock 40, being embossed 25, as one does not want to damage or destroy the material 40;

(b) Heat: the ability to maintain a consistent heat level for the best impression 25, as one does not want to damage or destroy the material 40;
(c) Die Depth: the artwork or the engraver's efforts will initially determine the die depth 12A, 14A, 32A, 34A, etc.

One can also do embossing 25, without ink, so that the image 25, is raised but not colored which is called "blind embossing." While, embossing 25, used in conjunction with ink, so that the raised area 42, 44, is colored, is called "color register embossing." While, embossing used in conjunction with foil stamping is called "combination stamping" or "combo stamping."

Embossing involves a separate stage in the production process, after any varnishing and laminating. It requires a separate press run. In addition to being used as a design element, embossing can also be used to improve the performance of a product, such as, for example, paper products like napkins, diapers, tissue paper, to name a few.

There are several types of embossing, for example:

Blind Emboss is another method of making the inventive pillow or cushion 23. Blind embossing does not include the use of ink or foil to highlight the embossed area 25. The change in the dimensional appearance of the material 40, is the only noticeable difference resulting from the embossing. The blind embossing process provides a clean and distinctive or subtle image 25, on the stock 40. It is best used to create a subtle impression 25, or low level of attention to the piece 40, yet provides some slight form of differentiation for the finished work 25.

Registered Emboss is another method of making the inventive pillow or cushion 23. Registered embossing is a process that places the embossed image 25, in alignment with another element created with ink, foil, punching, or with a second embossed image 25. Embossed in register (EIR) simulates the natural appearance. For example, when used on a hardwood flooring, which can be done by adding, depth and texture in alignment with a print 25, on the material 40.

Combination Emboss is another method of making the inventive pillow or cushion 23. Combination embossing is the process of embossing with foil, rubber or PVC stamping/plating the same image 25. It involves imprinting and aligning foil over an embossed image 25, to create a foil emboss 25. A sculptured die, generally made of brass is used for this procedure. The process requires close registration that must be controlled to keep the image and foil matched precisely. The process of embossing and foil stamping is accomplished in one operation with the use of a combination die. The combination die has a cutting edge around the perimeter to cleanly break the excess foil away from the embossed area 25.

Pastelling is another method of making the inventive pillow or cushion 23. Pastelling is also referred to as tint leaf embossing. It involves the process of using a combination die to provide a subtle antique appearance to a substrate 40, that is embossed and foil stamped. Pearl finishes, clear gloss, or similar pastel foil finishes can be selected that provide a soft two-color antique look (without scorching) to the embossed image 25. Lighter colored stocks 40, work best to provide this soft contrasting effect.

Glazing is another method of making the inventive pillow or cushion 23. Glazing refers to an embossed area 25, which has a shiny or polished appearance. Most often this process is accomplished with heat that is applied with pressure in order to create a shiny impression 25, on the stock 40. Dark colored heavy weight stocks 40, generally work best with glazing because the polished effect is much more noticeable and the dark color of the stock 40, helps to eliminate or soften any burned appearance 25, which may result from the application of the heat. When used in conjunction with foil, the process can provide the foil with a slightly brighter appearance.

Scorching is another method of making the inventive pillow or cushion 23. Scorching is similar to glazing except that it is not used to polish the stock 40. Instead, scorching does what it implies: as the temperature of the die heating plate(s) 60, 70, is increased beyond a normal temperature range, a scorched effect is created in the embossed image 25, which results in an antique or shaded appearance 25. It is best to use a lighter colored stock 40, for this procedure in order to provide a unique two-toned appearance. Caution should be used in requesting this effect, since it is easy to burn the stock 40, if too much heat is used. If scorching occurs too close to the printed copy, it can interfere with the clarity of the printed copy; however, this may be the effect that is desired for a particular application.

It should be appreciated that inventive pillow or cushion 23, can come in different shapes, sizes, materials, etc. The main purpose of this invention is to create an emboss image 25, 95, and/or a deboss image 25, 90, on the exterior surface 43, of the pillow or cushion or cover 23. The pillow or cushion 23, as used here could also mean, a cover that is used to cover or protect a pillow or cushion 23. Similarly, pillow or cushion 23, as used herein includes, for example, bolster 23, hassock 23, headrest 23, sham 23, throw pillow 23, to name a few.

The material for the inventive pillow or cushion 23, could be selected from a group comprising, for example, a knitted fabric, a flat knitted fabric, a circular knitted fabric, a woven fabric, a faux leather in mixed content of polyester, a faux leather in blended content of polyester, rayon, cotton, nylon, spandex yarns, polyvinyl material, artificial leather, genuine leather, and combinations thereof, to name a few.

The material used for the inventive pillow or cushion 23, should be firm enough to accept and display either permanently or semi-permanently the embossed image 25, 95, and/or debossed image 25, 90, but soft enough to be used by a user, such as, a human (not, shown).

Thus, the present invention is not limited to the embodiments described herein and the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

Still further, while certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions.

It should be further understood that throughout the specification and claims several terms have been used and they take the meanings explicitly associated herein, unless the context clearly dictates otherwise. For example, the phrase "in one embodiment" as used herein does not necessarily refer to the same embodiment, though it may. Additionally, the phrase "in another embodiment" as used herein does not necessarily refer to a different embodiment, although it may. Thus, various embodiments of the invention may be readily combined, without departing from the scope or spirit of the invention.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A fabric cushion, comprising:
    (a) a first fabric material having a first surface and a first peripheral edge, and wherein said first surface has at least one embossed image, and at least one debossed image;
    (b) a second fabric material having a second surface and a second peripheral edge; and
    (c) wherein said first peripheral edge is secured to said second peripheral edge to form said fabric cushion, such that said at least one embossed image, and said at least one debossed image, on said first surface project in an outwardly direction from said fabric cushion.

2. The fabric cushion of claim 1, wherein said fabric cushion is selected from a group consisting of a pillow, a bag, a pouch, and combinations thereof.

3. The fabric cushion of claim 1, wherein said first fabric material is selected from a group consisting of a knitted fabric, a flat knitted fabric, a circular knitted fabric, a woven fabric, a faux leather in mixed content of polyester, polyvinyl material, a faux leather in blended content of polyester, rayon, cotton, nylon, spandex yarns, artificial leather, genuine leather, and combinations thereof.

4. The fabric cushion of claim 1, wherein said second fabric material is selected from a group consisting of a knitted fabric, a flat knitted fabric, a circular knitted fabric, a woven fabric, a faux leather in mixed content of polyester, polyvinyl material, a faux leather in blended content of polyester, rayon, cotton, nylon, spandex yarns, artificial leather, genuine leather, and combinations thereof.

5. The fabric cushion of claim 1, wherein one of said embossed image, and said debossed image, on said fabric cushion is selected from a group consisting of an alphabet image, a numeral image, a scenic image, a pattern image, a structural image, and combinations thereof.

6. The fabric cushion of claim 1, wherein said first peripheral edge is secured to said second peripheral edge using at least one securing means, and wherein said at least one securing means is selected from a group consisting of stitching means, hook and loop means, an adhesive, an epoxy, a sewing means, a button means, a zipper means, and combinations thereof.

7. A fabric cushion, comprising:
    (a) a first fabric material having a first surface and a first peripheral edge, and wherein said first surface has at least one embossed image, and at least one debossed image;
    (b) a second fabric material having a second surface and a second peripheral edge, and wherein said second surface has at least one embossed image, and at least one debossed image; and
    (c) wherein said first peripheral edge is secured to said second peripheral edge to form said fabric cushion, such that said at least one embossed image, and said at least one debossed image, on said first surface project in an outwardly direction from said fabric cushion, and said at least one embossed image, and said at least one debossed image, on said second surface project in an outwardly direction from said fabric cushion.

8. The fabric cushion of claim 7, wherein said fabric cushion is selected from a group consisting of a pillow, a bag, a pouch, and combinations thereof.

9. The fabric cushion of claim 7, wherein said first fabric material is selected from a group consisting of a knitted fabric, a flat knitted fabric, a circular knitted fabric, a woven fabric, a faux leather in mixed content of polyester, polyvinyl material, a faux leather in blended content of polyester, rayon, cotton, nylon, spandex yarns, artificial leather, genuine leather, and combinations thereof.

10. The fabric cushion of claim 7, wherein said second fabric material is selected from a group consisting of a knitted fabric, a flat knitted fabric, a circular knitted fabric, a woven fabric, a faux leather in mixed content of polyester, polyvinyl material, a faux leather in blended content of polyester, rayon, cotton, nylon, spandex yarns, artificial leather, genuine leather, and combinations thereof.

11. The fabric cushion of claim 7, wherein one of said embossed image, and said debossed image, on said fabric cushion is selected from a group consisting of an alphabet image, a numeral image, a scenic image, a pattern image, a structural image, and combinations thereof.

12. The fabric cushion of claim 7, wherein said first peripheral edge is secured to said second peripheral edge using at least one securing means, and wherein said at least one securing means is selected from a group consisting of stitching means, hook and loop means, an adhesive, an epoxy, a sewing means, a button means, a zipper means, and combinations thereof.

* * * * *